(12) United States Patent
Kim et al.

(10) Patent No.: US 7,973,460 B2
(45) Date of Patent: Jul. 5, 2011

(54) COMPOSITION FOR FORMING ELECTRON EMITTER, ELECTRON EMITTER FORMED USING THE COMPOSITION, ELECTRON EMISSION DEVICE HAVING THE EMITTER, AND BACKLIGHT UNIT HAVING THE EMITTER

(75) Inventors: Yoon-Jin Kim, Suwon-si (KR); Jae-Myung Kim, Suwon-si (KR); Hee-Sung Moon, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 762 days.

(21) Appl. No.: 11/739,937

(22) Filed: Apr. 25, 2007

(65) Prior Publication Data
US 2007/0252508 A1 Nov. 1, 2007

(30) Foreign Application Priority Data
Apr. 26, 2006 (KR) .................. 10-2006-0037679

(51) Int. Cl.
H01J 9/02 (2006.01)
H01J 1/00 (2006.01)
H01J 1/62 (2006.01)
H01J 63/04 (2006.01)

(52) U.S. Cl. ......... 313/310; 313/495; 313/311; 313/309

(58) Field of Classification Search .................. None
See application file for complete search history.

(56) References Cited

U.S. PATENT DOCUMENTS

| 6,914,372 | B1 * | 7/2005 | Akiyama et al. | 313/309 |
|---|---|---|---|---|
| 2002/0076846 | A1 * | 6/2002 | Ihm | 438/34 |
| 2004/0108515 | A1 * | 6/2004 | Muroyama et al. | 257/144 |
| 2005/0001528 | A1 * | 1/2005 | Mao et al. | 313/309 |
| 2006/0103287 | A1 * | 5/2006 | Tsuei | 313/311 |
| 2006/0197429 | A1 * | 9/2006 | Ryu et al. | 313/311 |
| 2006/0226763 | A1 * | 10/2006 | Moon et al. | 313/495 |

FOREIGN PATENT DOCUMENTS

JP 2005220210 A * 8/2005
KR 2005115776 A * 12/2005

OTHER PUBLICATIONS

English machine translation of KR 2005-115776 (Kim).*
English machine translation of JP 2005-220210 (Maeda).*

* cited by examiner

*Primary Examiner* — Nimeshkumar D Patel
*Assistant Examiner* — Natalie K Walford
(74) *Attorney, Agent, or Firm* — Christie, Parker & Hale, LLP

(57) ABSTRACT

A composition for forming an electron emitter, an electron emitter formed using the composition, and a backlight unit including the electron emitter, where dispersion of the electron emission material in the composition is increased, and the composition includes an electron emission material, a vehicle, and carbon-based filler particles.

14 Claims, 6 Drawing Sheets

COMPOSITION FOR FORMING ELECTRON EMITTER, ELECTRON EMITTER FORMED USING THE COMPOSITION, ELECTRON EMISSION DEVICE HAVING THE EMITTER, AND BACKLIGHT UNIT HAVING THE EMITTER

CROSS-REFERENCE TO RELATED PATENT APPLICATIONS

This application claims the benefit of Korean Patent Application No. 2006-37679, filed Apr. 26, 2006, in the Korean Intellectual Property Office, the disclosure of which is incorporated herein in its entirety by reference.

BACKGROUND OF THE INVENTION

1. Field of the Invention

Aspects of the present invention relate to a composition for preparing an electron emitter, an electron emitter prepared using the composition, an electron emission device including the emitter, and a backlight unit including the emitter, and more particularly to an electron emitter that has increased life span, includes a carbon-based material as an electron emission material, and can be easily manufactured; an electron emission device and a backlight unit including the emitter and a composition for preparing the electron emitter used therein.

2. Description of the Related Art

In general, electron emission devices can be classified into electron emission devices using hot cathodes as an electron emitter and electron emission devices using cold cathodes as an electron emitter. Examples of electron emission devices having cold cathodes as an electron emitter include field emission device (FED) type electron emission devices, surface conduction emitter (SCE) type electron emission devices, metal insulator metal (MIM) type electron emission devices, metal insulator semiconductor (MIS) type electron emission devices, ballistic electron surface emitting (BSE) type electron emission devices, etc.

FED type electron emission devices operate based on a principle that a low work function material or high beta function material as an electron emitter easily emits electrons due to an electric charge difference in a vacuum. FED type electron emission devices using a tip-shaped structure mainly formed of Mo, Si, etc., and recently, devices using a nanomaterial such as nanotubes, nanowires, or the like as an electron emitter have been developed.

In an SCE type electron emission device, an electron emitter is formed by disposing a first electrode and a second electrode to face each other on a first substrate wherein a conductive thin film having fine cracks is disposed between the first and second electrodes. As an electric current flows on the surface of the conductive thin film, electrons are emitted from the electron emitter, in areas corresponding to the fine cracks.

MIM type electron emission devices and MIS type electron emission devices include an electron emitter respectively having a metal-dielectric layer-metal (MIM) structure and an electron emitter having a metal-dielectric layer-semiconductor (MIS) structure. The MIM type and MIS type electron emission devices emit electrons using a principle that when a voltage is applied between metals or between a metal and a semiconductor separated by a dielectric layer, electrons are moved, accelerated and emitted from the metal or semiconductor having a higher electron electric charge toward the metal having a lower electron electric charge.

BSE type electron emission devices emit electrons by applying a voltage to an ohmic electrode and a metal thin film, wherein an electron supply layer formed of a metal or semiconductor is formed on the ohmic electrode, and an insulating layer and the thin metal film are formed on the electron supply layer, using a principle that when a semiconductor is miniaturized to a dimension smaller than a mean free path of electrons in the semiconductor, the electrons travel without being dispersed.

The electron emission devices using cold cathodes generally include an electron emission material formed of carbon-based material. To manufacture an electron emitter using the carbon-based material as an electron emission material, a composition for forming an electron emitter including a carbon-based material, a vehicle, insulating material particles; and conductive particles is prepared in a paste form and printed on a substrate.

To properly disperse the materials to a desired degree in the vehicle is difficult as every dispersion degree or dispersive property of each material, which depends on the surface properties of the material, should be considered.

SUMMARY OF THE INVENTION

Aspects of the present invention provides a composition for forming an electron emitter in which the carbon-based material is easily dispersible, an electron emitter using the composition, and a backlight unit including the electron emitter.

According to an aspect of the present invention, there is provided a composition for forming an electron emitter, comprising an electron emission material, a vehicle, and carbon-based filler particles. The electron emission material may be carbon nanotubes. The carbon-based filler particles may be nanoporous carbon. The mass ratio of the carbon-based filler to the electron emitter may be between about 0.01 to 2.0 and, more specifically, between about 0.5 to 1.5.

According to another aspect of the present invention, there is provided an electron emitter formed using the composition for forming the electron emitter.

According to another aspect of the present invention, there is provided a backlight unit comprising: the electron emitter; a cathode electrically connected to the electron emitter; a phosphor layer disposed in a front side of the electron emitter; and an anode disposed in a front side of the electron emitter to accelerate the electrons emitted from the electron emitter toward the phosphor layer.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to aspects of the present invention, examples of which are illustrated in the accompanying drawings, wherein like reference numerals refer to the like elements throughout. The embodiments are described below in order to explain aspects of the present invention by referring to the figures.

A composition for forming an electron emitter according to aspects of the present invention includes an electron emission material, a vehicle, and carbon-based filler particles. Materials having a low work function and a high beta function may be used as the electron emission material. In particular, a carbon-based material such as carbon nanotubes (CNT), etc., and a nanomaterial such as nanotubes, nanowires, nanorods, etc., can be used. Carbon nanotubes are excellent in emitting electrons under low voltage driving conditions and thus can be used as the electron emitter in devices having a large area.

The vehicle can be formed of a resin component and a solvent component. The resin component can include at least one of a cellulose-based resin such as ethyl cellulose, nitro cellulose, etc.; an acryl-based resin such as polyester acrylate, epoxy acrylate and urethane acrylate, etc.; a vinyl-based resin such as polyvinyl acetate, polyvinyl butyral, polyvinyl ether, etc., however, the present invention is not limited thereto. A portion of the above-mentioned resin component can also be a photoresist resin.

The solvent component can include at least one of, for example, terpineol, butyl carbitol (BC), butyl carbitol acetate (BCA), toluene, and Texanol® (2,2,4-trimethyl-1,3-pentanediol monoisobutyrate) (TEXANOL is a registered trademark of Eastman Chemical Company, Kingsport, Tennessee).

Meanwhile, when the content of the solvent component in the vehicle is excessively low or high, the printability and flowabilitiy of the composition for forming an electron emitter can decrease. In particular, when the content of the solvent in the vehicle is excessively high, drying time can be increased.

The carbon-based filler particles can be carbon black, graphite, nanoporous carbon, etc. The carbon-based filler particles prevent the composition for forming the electron emitter from severely shrinking during a high temperature process, such as a firing process which is required to form the electron emitter in a printing process. Here, the nanoporous carbon refers to a carbon particle having a plurality of nanopores on the surface or throughout the volume thereof in which the average diameter of the nanopores may be in the range of 0.4 through 5 nm.

Also, the carbon-based filler particles can function as conductive particles which are included so that a voltage can be applied to the electron emission material contained in the electron emitter.

Moreover, when a carbon-based material, such as the carbon nanotubes, is used as the electron emission material in the vehicle, the carbon-based filler particles can be easily dispersed because the components have surface properties similar to the electron emission material.

In addition, the carbon-based filler particles have high thermal conductivity and thus can function as a heat sink to dissipate heat generated when electrons are emitted from the electron emission material. Therefore, rapid deterioration and consequent decrease in the life span of the electron emission material can be prevented.

The composition for forming the electron emitter can further include at least one material selected from a photoresist resin and a photo-initiator. Examples of the photoresist resin include an acrylate-based monomer, a benzophenone-based monomer, an acetophenone-based monomer, or a thioxanthone-based monomer, etc., and more specifically epoxy acrylate, polyester acrylate, 2,4-diethyloxanthone, or 2,2-dimetoxy-2-phenylacetophenone, etc., can be used. The photo-initiator initiates cross-linking of the photoresist resin when the photoresist resin is exposed to light. Examples of the photo-initiator include benzophenone, etc.

Figure 1:
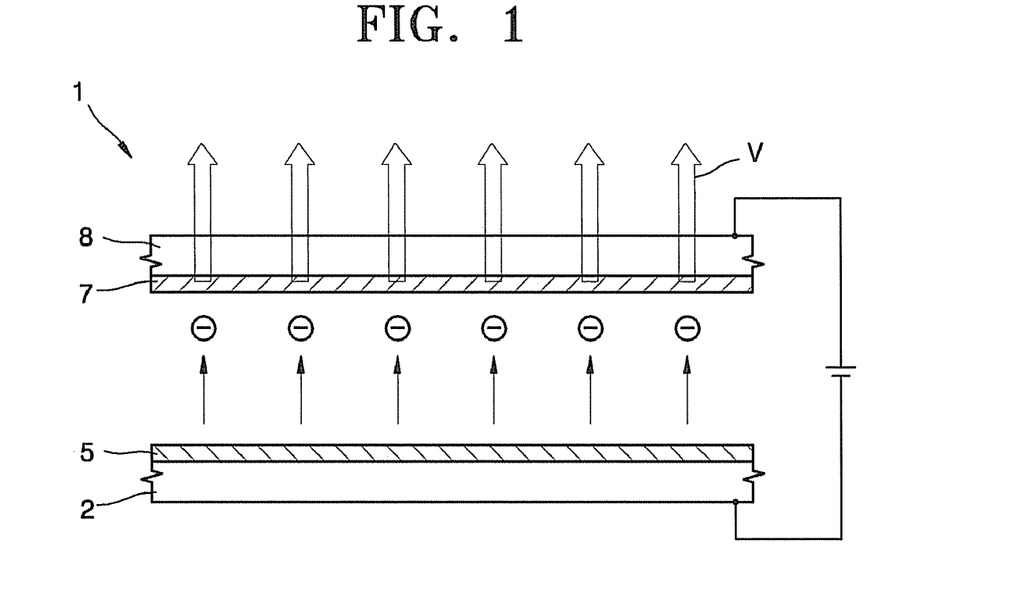
FIG. 1 is a partial cross-sectional view illustrating a structure of a backlight unit according to aspects of the present invention.

FIG. 1 illustrates an example of an electron emitter manufactured using a composition for forming an electron emitter according to aspects of the present invention, and an example of backlight unit 1 including the electron emitter 5. As illustrated in FIG. 1, an electron emitter 5 is disposed on a cathode 2. A phosphor layer 7 and an anode 8 are disposed in front of the electron emitter 5. When a negative voltage is applied to the cathode 2 and a positive voltage is applied to the anode 8, electrons are emitted from the electron emitter 5 toward the anode 8. The emitted electrons excite the phosphor layer 7 to generate visible light V. Further, electrons are emitted from the electron emitter 5 even when a positive voltage is applied to the cathode 2 and a positive voltage higher than the voltage applied to the cathode 2 is applied to the anode 8.

The cathode 2 and anode 8 can be formed of conventional electrically conductive materials such as Al, Ti, Cr, Ni, Au, Ag, Mo, W, Pt, Cu, Pd, etc., for example. The cathode 2 and anode 8 can also be formed of printed conductors formed of metal or metal oxide such as Pd, Ag, $RuO_2$, Pd—Ag, etc., and glass, or the cathode 2 and anode 8 can also be formed of transparent conductors such as ITO, $In_2O_3$ or $SnO_2$ or semiconductor material such as polysilicon, etc.

The phosphor layer 7 is formed of a cathode luminescence (CL) type phosphor which is excited by the accelerated electrons and releases the visible light V. Examples of the phosphor that can be used for the phosphor layer 7 include a phosphor for red light containing $SrTiO_3$:Pr, $Y_2O_3$:Eu, $Y_2O_3$S:Eu etc., a phosphor for green light containing $Zn(Ga, Al)_2O_4$:Mn, $Y_3(Al, Ga)_5O_{12}$:Tb, $Y_2SiO_5$:Tb, ZnS:Cu, Al, etc., a phosphor for blue light containing $Y_2SiO_5$:Ce, $ZnGa_2O_4$, ZnS:Ag, Cl, etc., however, the present invention is not limited thereto.

For the backlight unit 1 to operate normally, the space between the phosphor layer and the electron emitter should be maintained as a vacuum. For this, a spacer (not shown) to maintain the distance between the phosphor layer and the electron emitter and a glass frit (not shown) to seal the vacuum space can be provided. The glass frit is disposed around the vacuum space to seal the vacuum space.

Examples of the composition for forming the electron emitter according to aspects of the present invention are described below. Using nanoporous carbon, including a plurality of nanopores having an average diameter of 0.4 through 5.0 nm as carbon-based filler particles, three different compositions for forming electron emitters A, B, and C having different contents of carbon-based filler particles were prepared by adding 1.0 g of multi-walled carbon nanotubes (MWCNT) manufactured by ILJIN Nanotech to 43 g of Texanol and mixing with 12 g of polyester acrylate resin, 5 g of acrylphosphine oxide, 6.5 g of trimethylolpropane triacrylate (TMPTA), and 6.5 g of dipentaetythritol hexaacrylate (DPHA), while respectively changing the contents of the nanoporous carbon filler from 1.0, 1.5 to 2.0 g. Also using nanoporous carbon, including a plurality of nanopores having an average diameter of 0.4 through 5.0 nm as carbon-based filler particles, three different compositions for forming electron emitters G, H, and I having different contents of carbon-based filler particles were prepared by adding 2.0 g or 1.0 g of multi-walled carbon nanotubes (MWCNT) manufactured by ILJIN Nanotech to 43 g of Texanol and mixing with 12 g of polyester acrylate resin, 5 g of acrylphosphine oxide, 6.5 g of trimethylolpropane triacrylate (TMPTA), and 6.5 g of dipentaetythritol hexaacrylate (DPHA), while respectively changing the contents of the nanoporous carbon filler from 0.5 to 5.0 g. The mass ratios of the carbon filler to the carbon nanotubes is between about 0.25 to 5, with the most notable increase in life of the electron emitter having a ratio of the carbon filler to the carbon nanotubes between about 0.5 to 1.5. If the mass ratio of the carbon filler to the carbon nanotubes is less than 0.25, the carbon filler does not sufficiently improve the conductivity between the carbon nanotubes. If the mass ratio of the carbon filler to the carbon nanotubes is more than 5, the viscosity of the composition for forming the electron emitter can be too high for the composition to be easily printed. The content and life spans of each of the compositions A, B, C, G, H, and I is shown in Table 1.

As comparative examples, compositions for electron emitters D, E, and F were also prepared. The compositions for electron emitters D, E, and F are similar to the above compositions A, B, and C except that carbon filler particles are not included, and the carbon nanotube content was respectively increased from 1, 1.5, to 2 g in the compositions for electron emitters D, E, and F. The contents and life spans of compositions D, E, and F are shown in Table 1.

measured and illustrated therein. The life spans of the electron emitters manufactured by adding the carbon-based filler particles according to aspects of the present invention are estimated to be twice the life spans of electron emitters in which carbon-based filler particles are not included as filler. The life span is measured as follows. First, a voltage is applied to the electron emitters during pulse-driving of which the duty ratio is 1/100 and the pulse-driving is continued until a target current density of 1 mA/cm$^2$ is obtained. Then, the time that the current density reaches half the target current density at a constant voltage is measured. The measured time is the life span of the electron emitters. The results of life span measurement for each composition A, B, C, D, E, and F are shown in both Table 1 above and in FIG. 4. Referring to Table 1 and FIG. 4, when using the composition including the carbon-based filler particles, life span expansion is increased the most. Composition A exhibited the greatest life span of over 1000 hours. Composition B exhibited a great life span with a life span of over 1000 hours. Composition C exhibited a life span of about 210 hours. Compositions D, E, and F, none of which included nanoporous carbon-based filler, exhibited life spans of 125, 42, and 48 hours, respectively. It can be seen from comparison of compositions D, A, B, and C, with increasing nanoporous carbon-based filler content of 0, 1, 1.5, and 2 g, respectively, that the inclusion of the nanoporous carbon-based filler increases life span over composition D having no nanoporous carbon-based filler. The compositions A and B exhibit the greatest increases over the composition D. Further, increasing the content of the carbon nanotubes in the compositions E and F decreased the life span of those compositions.

TABLE 1

| | Unit: gram | | | | | | | | |
|---|---|---|---|---|---|---|---|---|---|
| Ingredient | A | B | C | D | E | F | G | H | I |
| Carbon Nano Tube | 1 | 1 | 1 | 1 | 1.5 | 2 | 2 | 1 | 1 |
| Carbon Filler | 1 | 1.5 | 2 | 0 | 0 | 0 | 0.5 | 0.5 | 5 |
| Texanol | 43 | 43 | 43 | 43 | 43 | 43 | 43 | 43 | 43 |
| Polyester acrylate resin | 12 | 12 | 12 | 12 | 12 | 12 | 12 | 12 | 12 |
| Acrylphosphine oxide | 5 | 5 | 5 | 5 | 5 | 5 | 5 | 5 | 5 |
| Trimethylolpropane triacrylate | 6.5 | 6.5 | 6.5 | 6.5 | 6.5 | 6.5 | 6.5 | 6.5 | 6.5 |
| Dipentaetylthritol hexaacrylate | 6.5 | 6.5 | 6.5 | 6.5 | 6.5 | 6.5 | 6.5 | 6.5 | 6.5 |
| Span (hour) | >1000 | >1000 | 210 | 125 | 42 | 48 | 187 | 890 | 164 |

Figure 2:
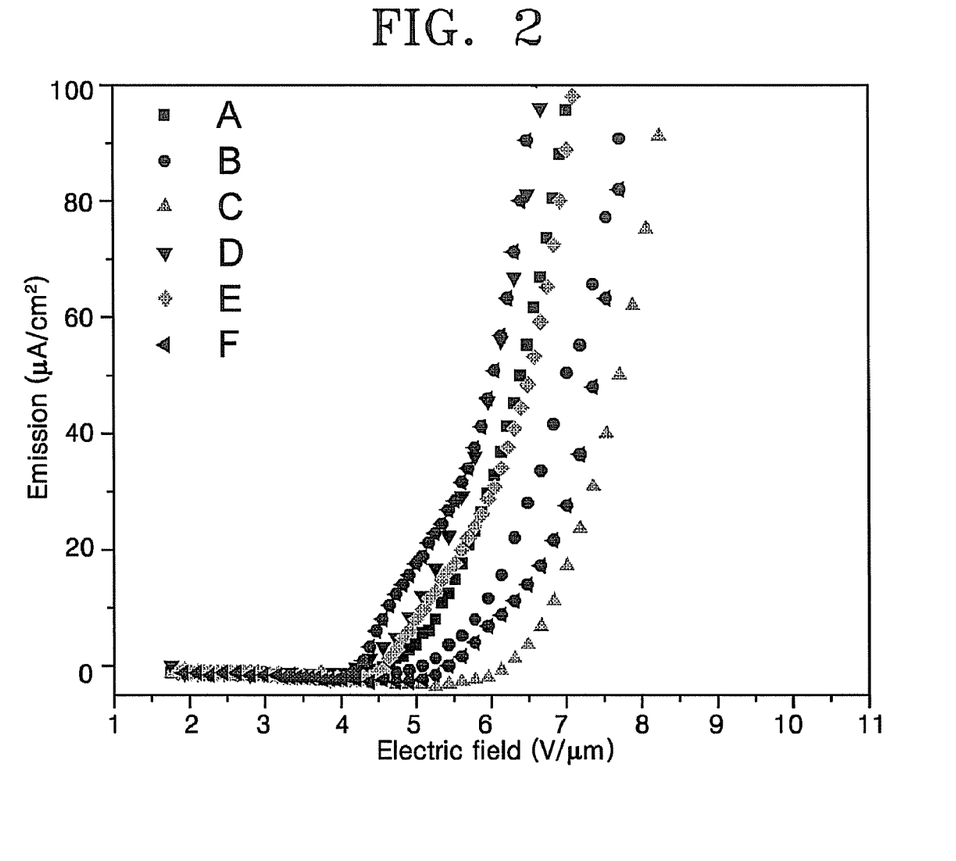
FIGS. 2 through 4 are graphs showing results of experiments obtained by applying the examples and comparative examples shown in Table 1 to the structure illustrated in FIG. 1.
Figure 3:
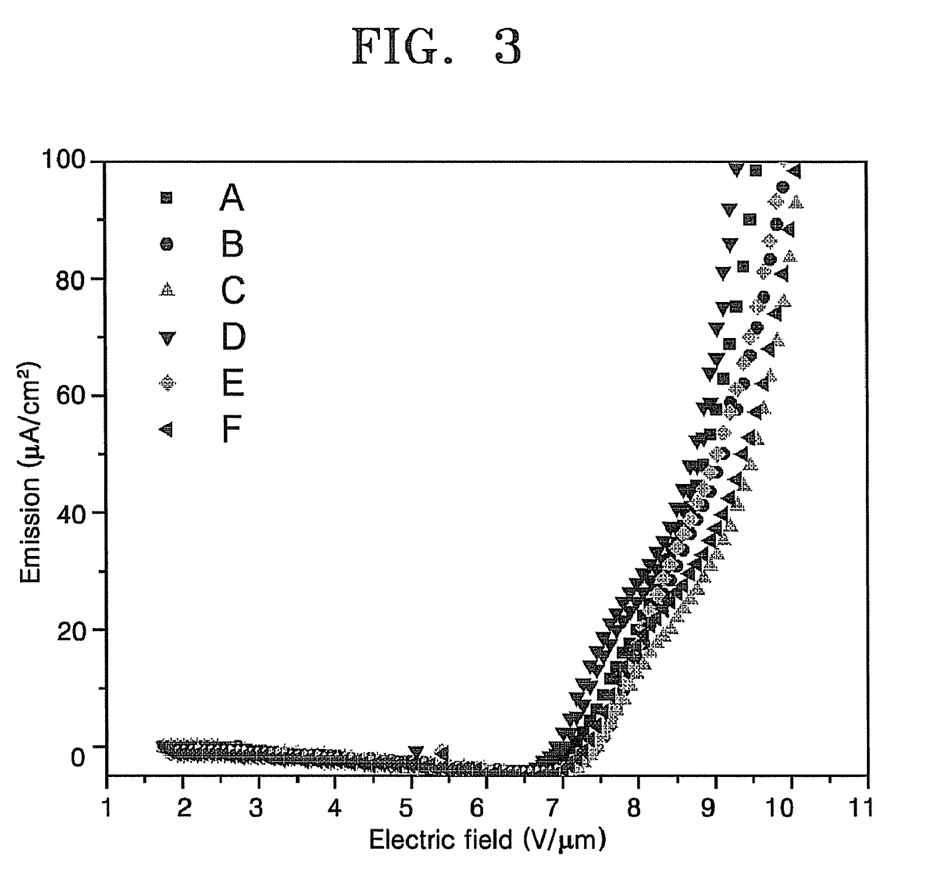

Each composition A, B, C, D, E, and F was printed on individual cathodes, dried, and fired at 450° C. Then, a diode structure as illustrated in FIG. 1 was manufactured, and a current density changing value according to an increase in an electric field was measured before and after aging. FIG. 2 shows the initial current density changing value before aging as curves A through F, and FIG. 3 shows the current density changing value after aging as curves A through F. The curves A through F indicate the current density for the compositions A, B, C, D, E, and F after aging in a constant current mode.

Referring to FIG. 2, the initial current density differs depending on the compositions because of minute differences in the shapes of the emitters manufactured for the experiment. Referring to FIG. 3, the result of experiment after aging shows that the curves A through F are similar irrespective of the compositions thereof.

Figure 4:
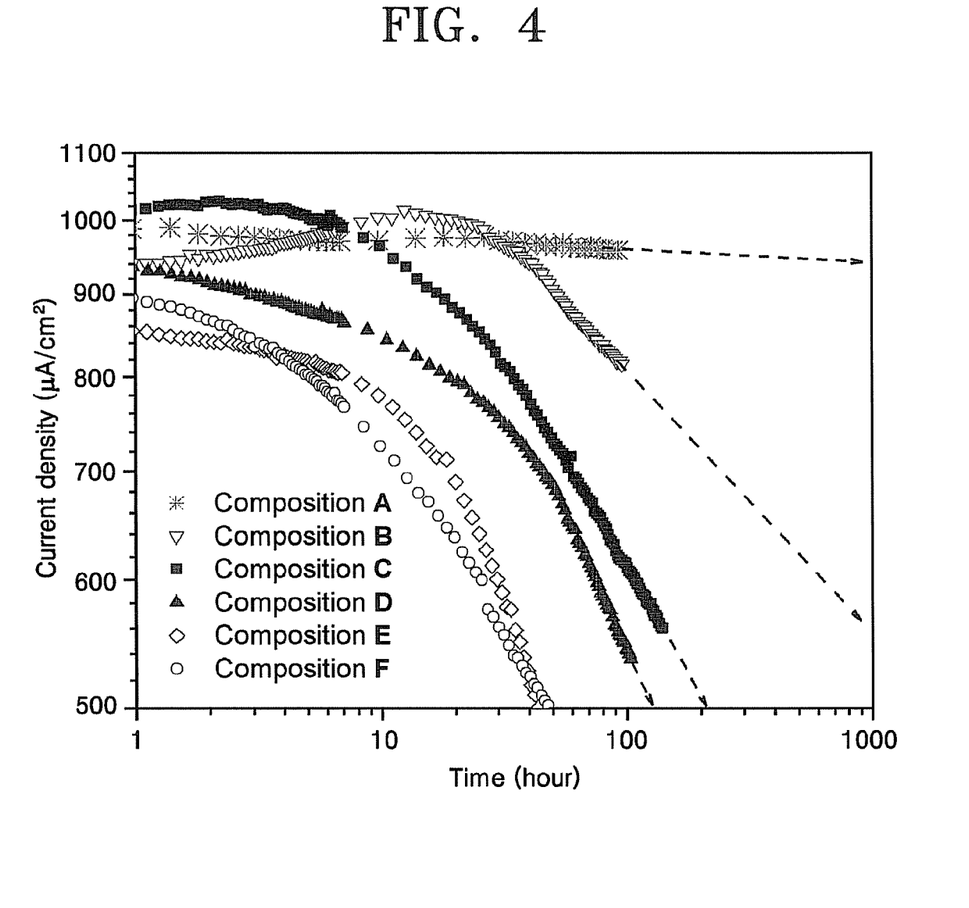

Referring to FIG. 4, the life spans of the electron emitters formed from the compositions A, B, C, D, E, and F were Meanwhile, the compositions for forming electron emitters and the electron emitters manufactured by using the compositions can also be used in electron emission devices emitting electrons by electric field formed between a gate electrode and a cathode; electron emission devices in which a cathode and a gate electrode are disposed in a direction to cross each other; and electron emission display devices including a phosphor layer in front of an electron emitter.

Electron emitters manufactured using the composition for forming electron emitters according to aspects of the current invention and electron emission display devices including the electron emitters according to aspects of the present invention are illustrated in FIGS. 5 through 9.

Figure 5:
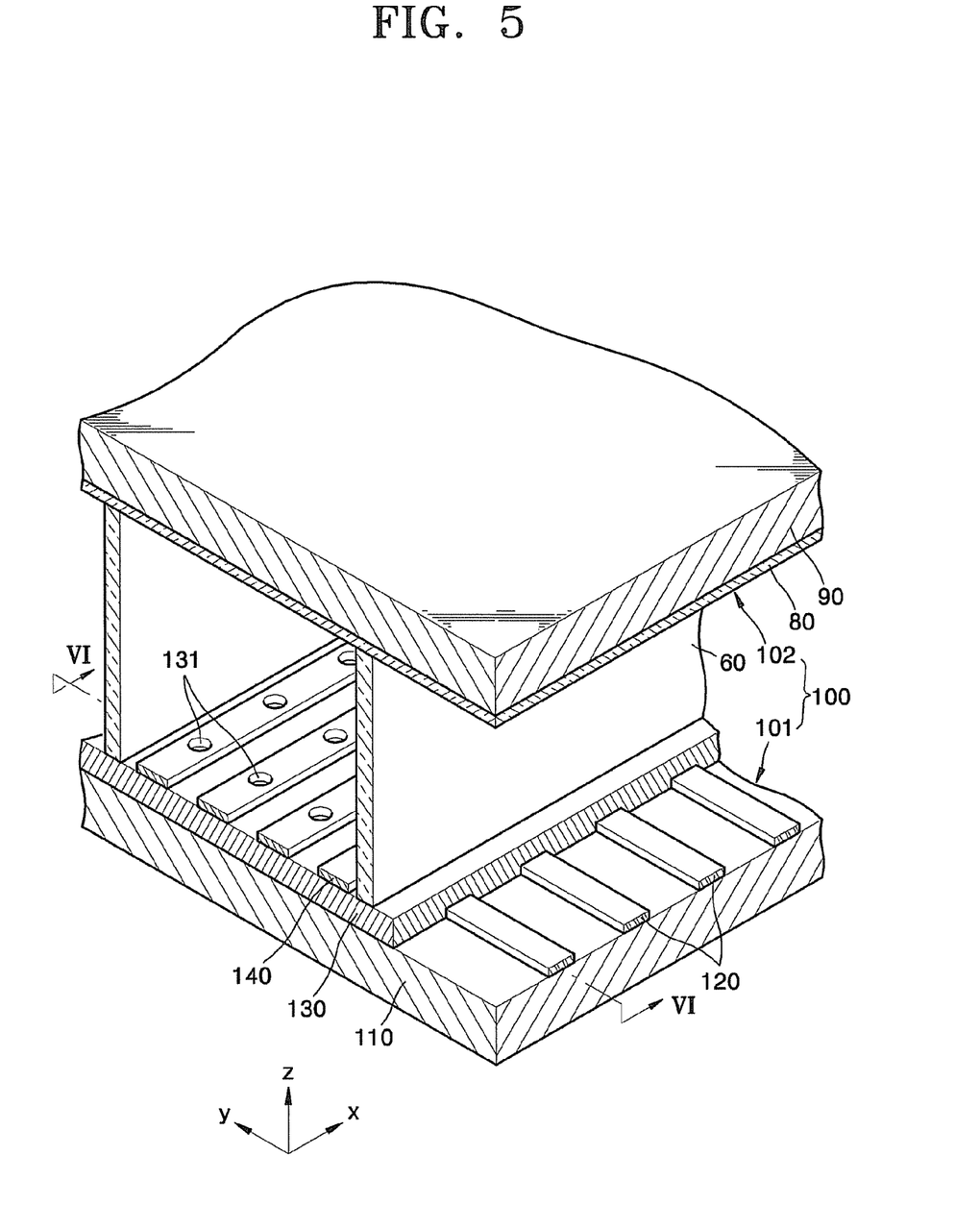
FIGS. 5 through 9 illustrate electron emission devices having electron emitters formed using a composition for forming an electron emitter according to aspects of the present invention.
Figure 6:
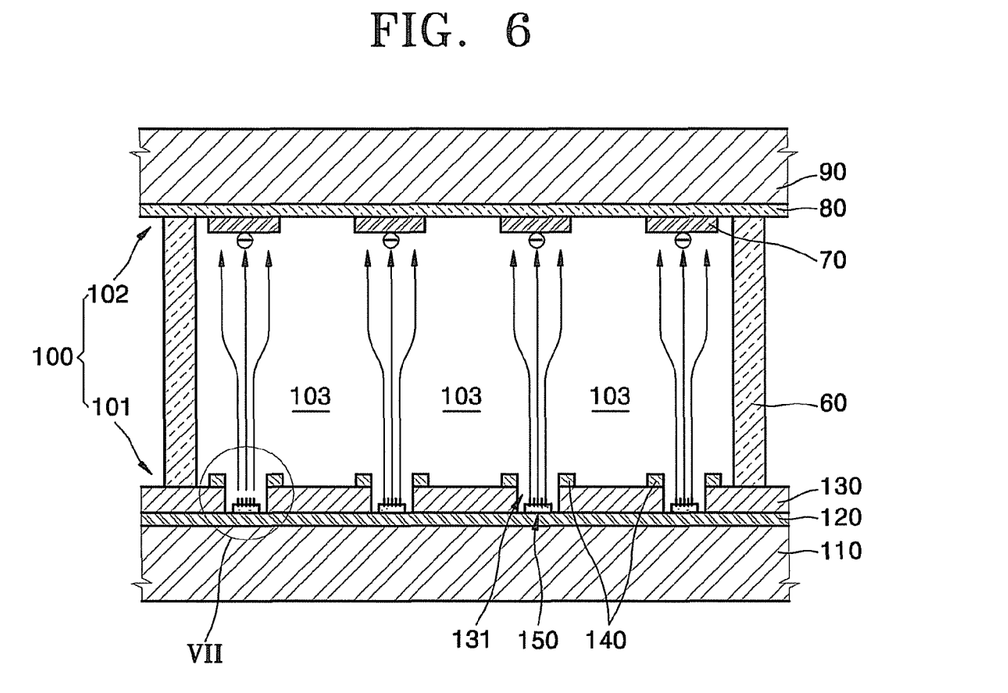
Figure 7:
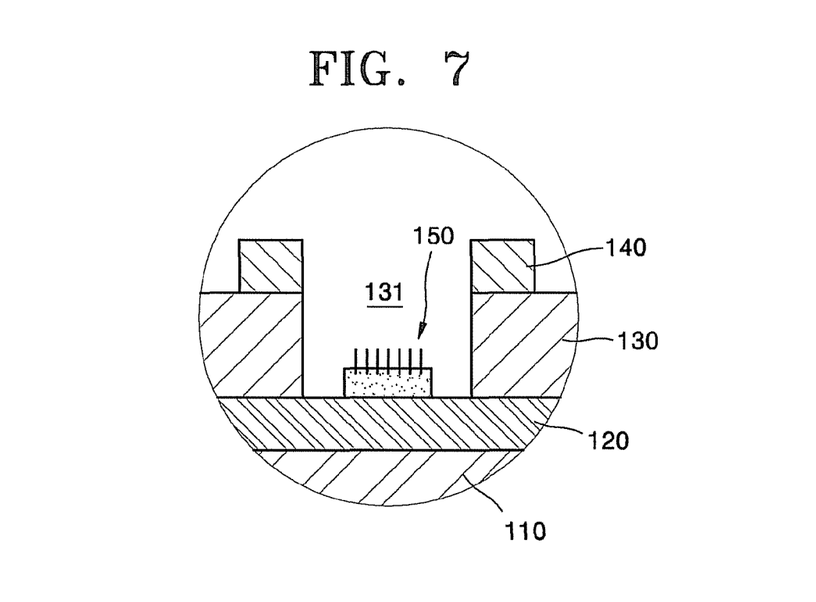

FIG. 5 illustrates a partial perspective view illustrating a structure of electron emission device, and FIG. 6 illustrates a cross-sectional view taken along line VI-VI in FIG. 5. FIG. 7 illustrates an enlarged view of part VII in FIG. 6.

Referring to FIGS. 5 through 7, an electron emission device 101 includes a base substrate 110, cathodes 120, gate electrodes 140, a first insulating layer 130, and electron emitters 150.

The base substrate 110 is an element in a panel shape having a predetermined thickness and can be silicon dioxide ($SiO_2$) glass, glass containing a small quantity of impurities, such as Na, a glass panel, a glass substrate coated with $SiO_2$, aluminium oxide, or a ceramic substrate. Further, a flexible material can be used to provide a flexible display apparatus.

The cathodes 120 are disposed in one direction on the base substrate 110 and can be formed of a conventional electrically conductive material. The material for forming the cathodes 120 can be the same as the material for forming the cathodes presented in FIG. 1 above. In FIG. 5, the cathodes 120 are disposed parallel to extend in the Y direction.

The gate electrode is formed of a conventional conductive material, such as the same material as the cathodes 120. The insulating layer 130 is disposed between the gate electrodes 140 and the cathodes 120 and insulates the gate electrodes 140 from the cathodes 120, thereby preventing a short between the gate electrodes 140 and the cathodes 120.

As best illustrated in FIGS. 6 and 7, the electron emitter 150 according to aspects of the current invention is disposed to electrically connect to the cathode 120 and extend therefrom to a height lower than the gate electrode 140. The electron emitter 150 contains an electron emission material and carbon-based filler particles. The electron emission material may be a material having a low work function and a high beta function. In particular, carbon nanotubes (CNT) can be used as a carbon-based material and nanotubes, nanowires and nanorods, etc., can be used as an electron emission nanomaterial. The nanotubes can be used to form electron emitters which belong to an electron emission display device having a large size such electron emitters emit electrons under driving with low voltage.

The electron emission device 101 as illustrated in FIGS. 5 through 7 can emit electrons due to an electric field formed between the cathodes 120 and the gate electrodes 140 by applying a negative voltage to the cathodes 120 and a positive voltage to the gate electrodes 140. Further, electrons can be emitted by the electron emission device 101 by applying a positive voltage to the cathode 120 and a greater positive voltage to the gate electrodes 140.

The electron emission device 101 can also be used in an electron emission display device 100 to display images by generating visible light. The electron emission display device 100 further includes a front panel 102 disposed parallel to the base substrate 110 of the electron emission device according to aspects of the present invention, wherein a front panel 102 further includes a front substrate 90, an anode 80 installed on the front substrate 90 and phosphor layers 70 installed on the anode 80.

The front substrate 90 is an element in a shape of a panel having a predetermined thickness similar to the base substrate 110 and can be made of the same material as the base substrate 110. The anode 80 also is made of conventional conductive materials, such as in the cathodes 120 and gate electrodes 140. The phosphor layers 70 are formed of a cathode luminescence (CL) type phosphor which is excited by accelerated electrons and emits visible light. The phosphors mentioned above with reference to FIG. 1 are examples of the CL type phosphor used in the phosphor layers 70; however, the present invention is not limited thereto.

To generate visible light to perform as a lamp or a backlight, and also to display images, the cathodes 120 and the gate electrodes 140 may be disposed to intersect or cross each other.

Electron emission holes 131 are formed at regions where the gate electrodes 140 and the cathodes 120 intersect, and the electron emitters 150 are disposed inside the electron emission holes 131.

The electron emission device 101 including the base substrate 110 and the front panel 102 including the front substrate 90 face each other at a predetermined distance apart to form an emission space, and spacers 60 are disposed to maintain the distance between the electron emission device 101 and the front panel 102. The spacer 60 can be made of an insulating material. In addition, the emission space formed between the electron emission device 101 and the front panel 102 is sealed using a frit around the periphery the emission space and maintains the emission space under a vacuum.

A negative voltage is applied to the cathodes 120, and a positive voltage is applied to the gate electrodes 140 thereby creating an electric field to force the electron emitters 150 to emit electrons. Further, a strong positive voltage is applied to the anodes 80 to accelerate the electrons emitted by the electron emitters 150 toward the anodes 80. Likewise, when a voltage is applied, electrons are emitted from needle-shaped materials forming the electron emitters 150, move toward the gate electrodes 140, and accelerate toward the anodes 80. The accelerated electrons move toward the anodes 80 and collide with the phosphor layers 70 disposed on the anodes 80, thereby exciting the phosphor layers 70 to generate visible light. The phosphor layers 70 are formed on the anodes 80 and disposed between the electron emitters 150 and the anodes 80 so that the electrons excite the phosphor layers 70 before reaching the anodes 80.

Figure 8:
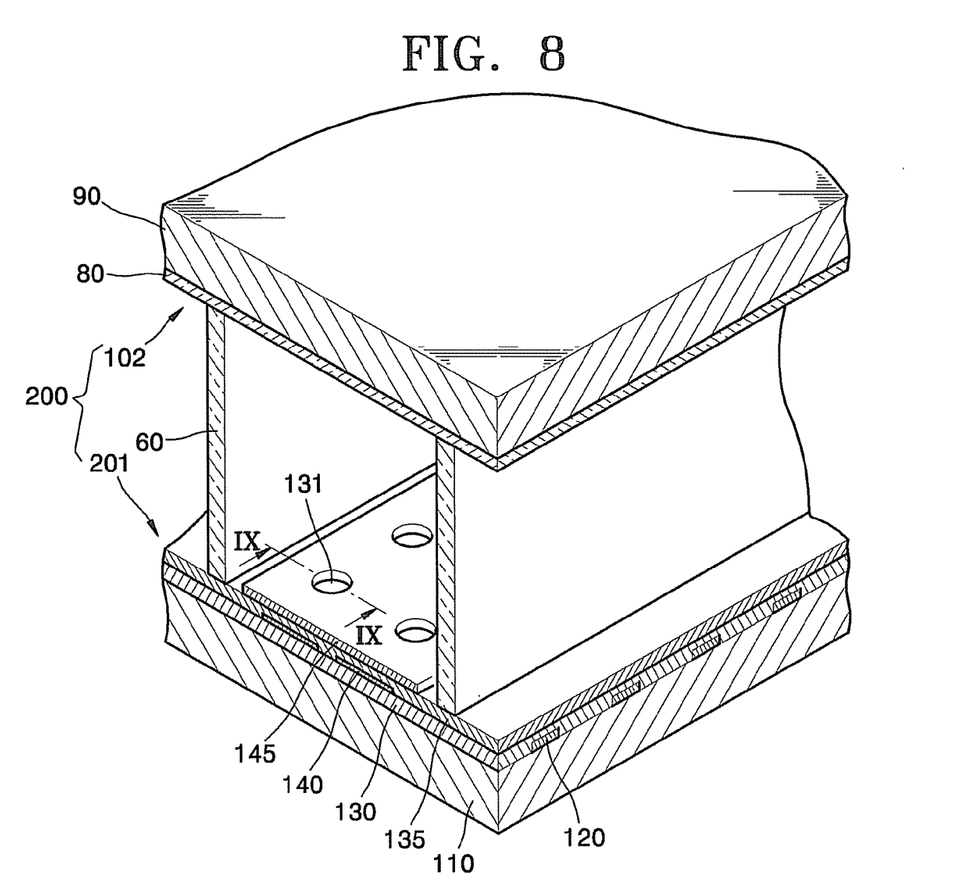
Figure 9:
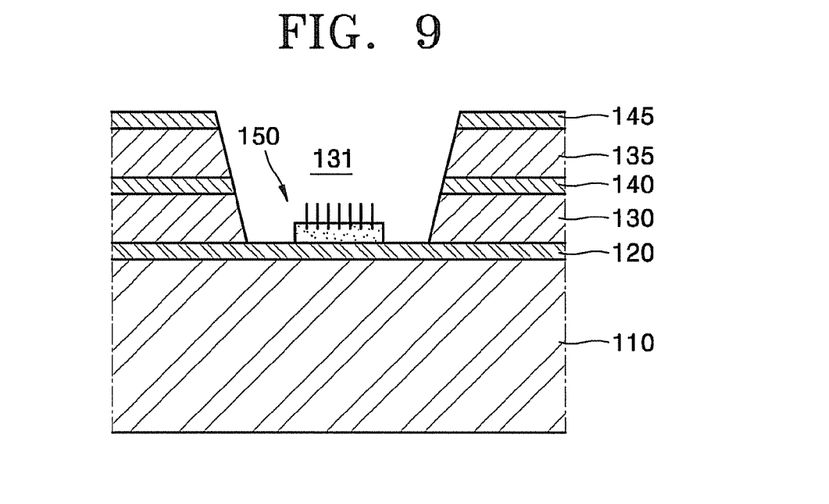

FIG. 8 is a perspective view illustrating an electron emission device 201 according to aspects of the present invention disposed in an electron emission display device 200, and FIG. 9 is a partial cross-sectional view taken along line IX-IX of FIG. 8.

Referring to FIGS. 8 and 9, the electron emission device 201 according to aspects of the current invention further includes a second insulating layer 135 covering the upper side of the gate electrodes 140 and a focusing electrode 145 formed on the upper side of the second insulating layer 135. The focusing electrode 145 focuses electrons emitted from the electron emitter 150 to the phosphor layers 70 (not shown) and prevent electrons from straying to the left and the right. Also, the carbon-based filler particles can be included beforehand in the process of forming the electron emitter to thereby improve life span of the electron emitters 150. In addition, the carbon-based filler particles included in electron emitters 150 can improve the uniformity of electron emission and the life span of electron emission devices 200. Moreover, dispersion in the process of forming the composition for forming electron emitter becomes easier.

As described above, according to aspects of the present invention, an electron emitter having increased life span and uniformity due to excellent thermal and electric conductive features can be manufactured more easily due to easier dispersion in the process of forming the composition for forming the electron emitter.

Although a few aspects of the present invention have been shown and described, it would be appreciated by those skilled in the art that changes may be made without departing from the principles and spirit of the invention, the scope of which is defined in the claims and their equivalents.

What is claimed is:

1. A composition for forming an electron emitter, comprising:
    an electron emission material comprising carbon nanotubes;
    a vehicle; and
    carbon-based filler particles comprising particles of a material selected from carbon black and nanoporous carbon.

2. A composition for forming an electron emitter, comprising:
    an electron emission material comprising carbon nanotubes;
    a vehicle; and
    carbon-based filler particles comprising nanoporous carbon particles.

3. The composition of claim 2, wherein the nanoporous carbon particles have an average pore diameter of 0.4 through 5 nm.

4. An electron emitter, comprising:
    the composition of claim 1.

5. A backlight unit, comprising:
    the electron emitter of claim 4;
    a cathode electrically connected to the electron emitter;
    an anode; and
    a phosphor layer between the anode and the electron emitter,
    wherein the anode accelerates electrons emitted from the electron emitter toward the phosphor layer.

6. The composition of claim 1, wherein the vehicle comprises:
    a resin component; and
    a solvent component.

7. The composition of claim 6, wherein the resin component comprises:
    a cellulose-based resin, an acryl-based resin, and/or a vinyl-based resin.

8. The composition of claim 6, wherein the resin component comprises:
    a photoresist resin; and
    a photo-initiator.

9. The composition of claim 6, where in the solvent component comprises:
    terpineol, butyl carbitol, butyl carbitol acetate, toluene, and/or 2,2,4-trimethyl-1,3-pentanediol monoisobutyrate.

10. The composition of claim 1, wherein a mass ratio of the carbon-based filler particles to the carbon nanotubes is between about 0.25 to 5.

11. The composition of claim 10, wherein the mass ratio is between about 0.5 to 1.5.

12. The composition of claim 1, wherein the carbon-based filler particles dissipate heat generated by electron emission.

13. A composition for forming an electron emitter, comprising:
    an electron emission material comprising carbon nanotubes;
    a vehicle comprising a resin component and a solvent component; and
    a filler comprising nanoporous carbon particles.

14. The composition of claim 13, wherein the nanoporous carbon particles have an average pore diameter of about 0.4 to 5 nm.

* * * * *

UNITED STATES PATENT AND TRADEMARK OFFICE
CERTIFICATE OF CORRECTION

PATENT NO. : 7,973,460 B2
APPLICATION NO. : 11/739937
DATED : July 5, 2011
INVENTOR(S) : Yoon-Jin Kim et al.

It is certified that error appears in the above-identified patent and that said Letters Patent is hereby corrected as shown below:

In the Claims

Column 10, Claim 9, line 9        Delete "where in" Insert -- wherein --

Signed and Sealed this
Twenty-second Day of May, 2012

David J. Kappos
*Director of the United States Patent and Trademark Office*